United States Patent [19]

Naka et al.

[11] Patent Number: 5,462,684
[45] Date of Patent: Oct. 31, 1995

[54] GREASE COMPOSITION CONTAINING ALKYL DIPHENYL ETHER OIL AND DIUREA THICKENER

[75] Inventors: Michiharu Naka, Odawara; Hideki Koizumi, Chigasaki; Yuzo Takahashi, Fujisawa; Hirotugu Kinoshita, Yokohama; Masaru Mishima, Kawasaki, all of Japan

[73] Assignees: Nippon Oil Co., Ltd.; NSK Ltd., both of Tokyo, Japan

[21] Appl. No.: 81,810

[22] Filed: Jun. 23, 1993

[30] Foreign Application Priority Data

Jun. 29, 1992 [JP] Japan .................... 4-171025

[51] Int. Cl.⁶ .......................................... C10M 115/08
[52] U.S. Cl. .......................................... 252/51.5 R
[58] Field of Search ............. 252/51.5 R; C10M 115/08

[56] References Cited

U.S. PATENT DOCUMENTS

| | | | |
|---|---|---|---|
| 3,423,318 | 1/1969 | Bauer et al. | 252/49.6 |
| 3,929,650 | 12/1975 | King et al. | 252/33.4 |
| 4,115,284 | 9/1978 | Kinoshita et al. | 252/29 |
| 4,915,860 | 4/1990 | Kinoshita et al. | 252/51.5 R |
| 5,043,085 | 8/1991 | Kinoshita et al. | 252/51.5 R |
| 5,059,336 | 10/1991 | Naka et al. | 252/51.5 R |
| 5,145,591 | 9/1992 | Kinoshita et al. | 252/51.5 R |

FOREIGN PATENT DOCUMENTS

| | | |
|---|---|---|
| 0414191A1 | 2/1991 | European Pat. Off. . |
| 0508115A1 | 10/1992 | European Pat. Off. . |
| 1259097 | 10/1989 | Japan .............. C10M 115/08 |
| 3028299 | 2/1991 | Japan .............. C10M 115/08 |

*Primary Examiner*—Jerry D. Johnson
*Attorney, Agent, or Firm*—Darby & Darby

[57] ABSTRACT

A grease composition for a high-speed rolling bearing contains an alkyl diphenyl ether oil as a base oil, and at least one of diurea compounds represented by the formula (1)

$$R^2-\text{NHCNH}-R^1-\text{NHCNH}-R^3 \quad (1)$$
$$\phantom{R^2-\text{NH}}\overset{\text{O}}{\|}\phantom{\text{CNH}-R^1-\text{NH}}\overset{\text{O}}{\|}$$

wherein $R^1$ denotes a divalent aromatic hydrocarbon residue having 6 to 15 carbon atoms and $R^2$ and $R^3$ may be the same or different and each represent a cyclohexyl group, a cyclohexyl derivative group having 7 to 12 carbon atoms or an alkyl group having 8 to 20 carbon atoms. The diurea compound is contained as a thickener in the base oil. The content in percent of the cyclohexyl group and the cyclohexyl derivative group in the diurea compound is such that a value of [{(numbers of cyclohexyl groups and derivative groups thereof)/(numbers of cyclohexyl groups and derivative groups thereof plus numbers of alkyl groups)}×100] is equal to 50 to 100%.

11 Claims, No Drawings

GREASE COMPOSITION CONTAINING ALKYL DIPHENYL ETHER OIL AND DIUREA THICKENER

BACKGROUND OF THE INVENTION

This invention relates to a grease composition for high-speed rolling bearings. More particularly, it relates to a grease composition employed for bearings in electrical components and accessory devices for automotive vehicles, such as alternators, electromagnetic clutches, tension pulleys or the like. The rolling bearings are employed for electrical components employed for automotive vehicles, such as alternators, electromagnetic clutches for car air conditioners, idle pulleys or electric fan motors, and accessories such as fluid couplings for cooling fans, tensioners for timing belts or pneumatic pumps. Mainly the greases are employed for lubricating the rolling bearings.

Conventional greases for rolling bearings include lithium soap greases employing less costly mineral oils as the base oil, polyurea greases or greases known as wide-range greases, in which the ester synthetic oils are thickened with lithium soap or sodium terephthalamate. If the service life longer than those of the above greases or high temperature durability are required, greases employing silicone oil, fluorosilicone oil or fluorinated oil (perfluoro polyether oil) are employed as the base oil.

In automotive vehicles, for keeping pace with the propagation of FWD or front wheel-driven cars aimed at reducing the size and weight of the vehicles, and with the demand for an increased living space within the cars, the engine room space is necessarily reduced, while the electrical components and accessories with smaller size and weight are required. In addition, higher performance and higher output are demanded of the electrical components and accessories, such that in the case of an alternator, for example it becomes necessary to increase the rotational speed by special designing artifices to compensate for reduction in output power caused by size reduction. Moreover, in keeping with the demand for quiet operation, the degree of hermetic sealing of the engine room is advanced and hence the engine room tends to be heated so that components capable of withstanding higher temperatures are necessitated. Currently, a longer service life of the bearings, less grease leakage, superior low-temperature properties, superior rust-preventive properties, and superior noiseless properties of the bearings are demanded in connection with the greases for use with sealed bearings employed in electrical components and accessories for automotive vehicles.

Under these conditions, the conventional greases, such as mineral oil-lithium soap grease, mineral oil-polyurea grease or ester synthetic oil-lithium soap grease, are unsatisfactory in connection with the service life of the bearings employed under high temperature and high speed operating conditions. Besides, the conventional greases such as the greases employing silicone oil, fluorosilicone oil or fluorinated oil as the base oil are not fully satisfactory in that they fail to meet such properties as load withstanding properties, wear resistance, rust-preventative properties or noiseless properties, while being extremely expensive.

For the grease for long service life high speed rolling bearings, a grease employing synthetic oils, such as poly-α-olefin or ester and also employing urea compounds as the thickener has been developed and put to practical application.

However, the recent tendency is towards increasingly higher performance and higher output of the electrical components and accessaries for automotive vehicles, such as alternators, and hence towards an increasingly higher speed and temperatures under which the grease is employed. For example, the demand is raised for increasing the operating temperature and the operating speed from 130° to 140° C. and 10000 to 16000 rpm to 150° to 180° C. and 18000 to 22000 rpm, respectively. With the urea grease employing the aforementioned poly α-olefin and ester as base oil, satisfactory service life of the grease cannot necessarily be achieved.

On the other hand, with bearings for electromagnetic clutches and intermediate pulleys, to say nothing of the bearing for alternators, not only the problem of reduction in service life of the grease due to elevated operating temperatures, but also the problem of the bearing peel life due to high load conditions caused by the use of poly-V-belts, has been presented. In this consideration, the urea grease employing the aforementioned poly α-olefin or ester cannot meet the demands raised of the grease.

Besides, the grease employing alkyl diphenyl ether as the base oil and also employing an urea thickener has also been proposed by Japanese Laid-Open Patent Application Nos. 1-259097 and 3-28299. However, the above-mentioned problems have not been solved satisfactorily with this prior art grease so that a further improvement has been desired.

SUMMARY OF THE INVENTION

It is an object of the present invention to provide a grease composition for high-speed rolling bearing in which the service life of the grease and the peeling time limit of the bearing may be prolonged as compared with the conventional greases.

The above and other objects of the present invention will become apparent from the following description.

According to the present invention, there is provided a grease composition for a high-speed rolling bearing containing an alkyl diphenyl ether oil as a base oil, and at least one of diurea compounds represented by the formula (1)

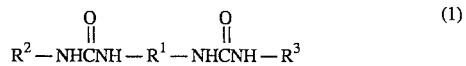

wherein $R^1$ denotes a divalent aromatic hydrocarbon residue having 6 to 15 carbon atoms and $R^2$ and $R^3$ may be the same or different and each denote a cyclohexyl group, a cyclohexyl derivative group having 7 to 12 carbon atoms or an alkyl group having 8 to 20 carbon atoms, the diurea compound being contained as a thickener in the base oil, the content in percent of the cyclohexyl group and the cyclohexyl derivative group in the diurea compound being such that the value of [{(the numbers of cyclohexyl groups and/or derivative groups thereof)/(the numbers of cyclohexyl groups and/or derivative groups thereof plus the numbers of alkyl groups)}×100] is equal to 80 to 100%.

DESCRIPTION OF PREFERRED EMBODIMENTS

The contents of the present invention will be described in detail hereinbelow.

An alkyl diphenyl ether oil employed as base oil in the composition of the present invention includes those oils customarily employed as the base oil for lubricating oils such as those base oils obtained by adding 1 mol or more, preferably 1 to 3 mols, of α-olefin having 10 to 22 and preferably 10 to 16 carbon atoms to 1 mol of diphenyl ether. The aforementioned alkyl diphenyl ether oil preferably has a dynamic viscosity of 20 to 300 cSt at 40° C. If needed, lubricating oils other than alkyl diphenyl ether oil such as one or more of pentaerythritol ester, dipentaerythritol ester or trimethylol propane ester, may be mixed into the alkyl diphenyl ether oil. Although the mixing ratio may be selected arbitrarily, the lubricating oils other than alkyl diphenyl ether may be added in an amount of 100 parts by weight or less to 100 parts by weight of alkyl diphenyl ether oil.

In the composition of the present invention, the thickener contained in the base oil includes at least one of the diurea compounds represented by the formula (1) and contains cyclohexyl groups and/or derivative groups thereof in an amount such that [{(the numbers of cyclohexyl groups and/or derivative groups thereof)/(the numbers of cyclohexyl groups and/or derivative groups thereof plus the numbers of alkyl groups)}×100] is equal to 50 to 100%, preferably 70 to 100%. If the content of the cyclohexyl groups and/or derivative groups thereof is less than 50%, shear stability is lowered, while the leakage from the bearing is increased to shorten the service life of the grease.

In the formula (1) for the diurea compound, the groups shown by the following formulas (2) to (4) are preferably enumerated as C6 to C15 divalent aromatic hydrocarbon groups shown by $R^1$. However, any other divalent aromatic hydrocarbon groups may be employed without any particular limitations.

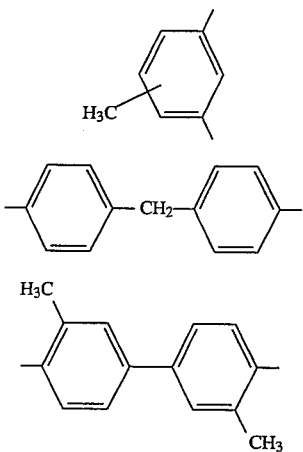

(2)

(3)

(4)

In the above formula (1), the C7 to C12 cyclohexyl derivative groups represented by $R^2$ and $R^3$ in formula (1), may be specifically enumerated by, for example methyl cyclohexyl group, dimethyl cyclohexyl group, ethyl cyclohexyl group, diethyl cyclohexyl group, propyl cyclohexyl group, isopropyl cyclohexyl group, 1-methyl-3-propyl cyclohexyl group, butyl cyclohexyl group, pentyl cyclohexyl group, pentylmethyl cyclohexyl group and hexyl cyclohexyl group. The C8 to C20 alkyl groups may specifically be enumerated by, for example, octyl group, nonyl group, decyl group, undecyl group, dodecyl group, tridecyl group, tetradecyl group, pentadecyl group, hexadecyl group, heptadecyl group, octadecyl group, nonadecyl group and eicosyl group.

There is no particular limitation to the above-mentioned diurea compounds if the above-mentioned conditions are satisfied. Among the preferred combinations of $R^2$ and $R^3$ in the diurea compounds, there are, for example cyclohexyl- cyclohexyl group, cyclohexyl-tetradecyl group, cyclohexylhexadecyl group, cyclohexyl-octadecyl group, tetradecyltetradecyl group, tetradecyl-hexadecyl group, tetradecyloctadecyl group, hexadecyl-hexadecyl group, hexadecyl-octadecyl group and octadecyl-octadecyl group combinations. What is crucial at any rate is that the content of the cycloxylhexyl groups or derivatives thereof be contained in an amount of 50 to 100% and preferably 70 to 100%.

Although the method for producing the thickener consisting in the above-mentioned diurea compound employed in the present invention is arbitrary, it may be produced in one step by reacting an amine with an isocyanate at 10° to 200° C. Although a volatile solvent may employed at this time, the composition of the present invention mat be directly produced by employing an alkyl diphenyl ether oil as a solvent.

There is no particular limitation to the thickener content in the composition of the present invention. Preferably, the thickener content is 5 to 30 wt. % and more preferably 16 to 25 wt. %. If the content of the diurea compound is less than 5 wt. %, the capacity as a thickener becomes insufficient, whereas if it exceeds 30 wt. %, the resulting composition becomes too hard as a grease and hence cannot display sufficient lubricating properties.

In addition to the above-mentioned essential components, well-known additives may also be contained in the composition of the present invention for improving its excellent properties. These additives may be enumerated by, for example thickeners, such as metal soap, benton or silica gel; antioxidants, such as amine, phenol, sulfur antioxidants, or zinc dithiophosphate; extreme pressure agents such as chlorine, sulfur, phosphor or zinc dithiophosphate extreme pressure agents; oiliness agents such as fatty acids or animal or vegetable oils; rust preventives, such as petroleum sulfonate, dinonyl naphthalene sulfonate or sorbitan ester; metal deactivators, such as benzotriazole or sodium nitrite; and viscosity index improvers, such as polymethacrylate, polyisobutylene and polystyrene. These may be used singly or as a mixture. The additives are preferably employed in an amount of 20 wt. % or less based on the total weight of the composition.

The grease composition for high-speed rolling bearings according to the present invention is superior in bearing service life, grease service life, prevention of leakage in bearings, high-speed lubricating properties and acoustic properties and hence may be highly useful as a bearing grease for electric components or accessories for automotive vehicles, such as alternators, electro-magnetic clutches or tension pulleys.

EXAMPLES OF THE INVENTION

The present invention will be explained in more detail with reference to Examples and Comparative Examples. It is noted that the present invention is not limited to these Examples which are given only for the sake of illustration. Examples 1 to 5 and Comparative Examples 1 to 6

The base oils, isocyanates and amines shown in Table 1 were employed in amounts shown in Table 1. In each case an isocyanate was added to the base oil and dissolved on heating. Similarly, an amine was added to the base oil and dissolved on heating and the resulting mixture was added to the isocyanate-amine mixture and stirred. A gel substance was immediately produced. This substance was passed through a roll mill and kneaded to produce each grease sample. In Comparative Example 4, however, lithium 12 hydroxy stearate was added to the base oil and dissolved on heating. The same base oil was further added to the resulting solution and cooled rapidly to produce a gel substance which was further agitated and passed through a roll mill to produce the grease. The types and amounts of the isocyanates, amines and base oils employed, the amount of lithium 12 hydroxy stearate and the structure of the thickeners are shown in Table 1. The following tests were conducted on the produced grease samples. The test results are shown in Table 2.

Bearing Grease Service Life Test 1.0 g of grease was sealed in a deep groove ball bearing, with an inner diameter of 17 mm, an outer diameter of 40 mm and a width of 12 mm, fitted with a contact rubber seal and plastic retainer, and the bearing was run into continuous rotation at a rotational speed of 15000 rpm, an outer bearing race temperature of 180° C., a radial load of 10 kgf and an axial load of 20 kgf. The operating time which elapsed until burning was incurred and the bearing outer race temperature was increased to 195° C. or higher.

High-Speed Burning Test 2.3 g of grease was sealed in a deep groove ball bearing, with an inner diameter of 17 mm, an outer diameter of 47 mm and a width of 14 mm, fitted with a contact rubber seal and a plastic retainer, and the bearing was run into continuous rotation at a rotational speed of 20000 rpm, an outer bearing race temperature of 150° C. and a radial load of 10 kgf. The operating time which elapsed until burning was incurred and the bearing outer race temperature was increased to 165° C. or higher.

Bearing Grease Leakage Test 1.0 g of grease was sealed in a deep groove ball bearing, with an inner diameter of 17 mm, an outer diameter of 40 mm and a width of 12 mm, fitted with a contact rubber seal and a plastic retainer, and the bearing was run into continuous rotation for 20 hours at a rotational speed of 15000 rpm, an outer bearing race temperature of 180° C., a radial load of 10 kgf and an axial load of 20 kgf. The weight of the grease which was leaked until the end of the test was measured.

Bearing Service Life Test 2.3 g of grease was sealed in a deep groove ball bearing, with an inner diameter of 17 mm, an outer diameter of 47 mm and a width of 14 mm, fitted with a contact rubber seal and a plastic retainer, and the bearing was run into continuous rotation at a rotational speed of 18000 rpm, an atmosphere temperature of 110° C. and a radial load of 200 kgf. The time which elapsed until unusual vibrations were incurred in the bearing was measured.

Acoustic Test 0.7 g of grease was sealed in an open deep groove ball bearing, with an inner diameter of 15 mm, an outer diameter of 35 mm and a width of 11 mm, fitted with a retainer formed by a punched steel sheet, and the bearing was run into continuous rotation for 120 seconds at a rotational speed of 1800 rpm, an ambient temperature of the atmosphere and an axial load of 3 kgf. The speed of the vibrations incurred during the continuous rotation was read on a noise tester, and the number of peak values about four times or more as large as the effective values of the speed of the vibrations was counted. The following evaluation was made on the number of the peak values.

Number of Peak Pulse Values

In Table 2, showing the results of the evaluation, ●, o, Δ and x indicate small, medium, large and extremely large numbers of the peak values, respectively.

It is seen from Table 2 that superior results could be achieved with the grease compositions of the present invention. It is also seen that the grease samples produced using the base oil other than alkyl diphenyl ether or the thickener other than the diurea compound of the present invention are unable to satisfy the test items in their entirety.

TABLE 1

| | | | Ex. 1 | Ex. 2 | Ex. 3 | Ex. 4 |
|---|---|---|---|---|---|---|
| Base Oil Type | | | DPE | DPE | DPE | DPE |
| Starting Material for Thickeners 1) | Isocyanates (g) | MDI | 128 | | 103 | 91 |
| | | TDI | | 69 | | |
| | Amines (g) | CHA | 102 | 47 | 65 | 69 |
| | | ODA | | 85 | | 10 |
| | | OA | | | 22 | |
| | | P-TD | | | | |
| | Li12OHSt (g) | | | | | |
| Thickener Structure (mol %) 2) | Diurea Compounds [R$^1$—R$^1$—R$^3$] | | CH—M—CH(100) | CH—T—CH(44) CH—T—OD(32) OD—T—OD(24) | CH—M—CH(76) CH=M—O(8) O—M—O(16) | CH—M—CH(93) CH—M—OD(4) OD—M—OD(3) |
| | Others | | | | | |
| Amount of Thickener (wt. %) | | | 23 | 20 | 19 | 17 |
| CHA Ratio of Thickener (%) | | | 100 | 60 | 80 | 95 |
| Consistency 60 w | | | 278 | 255 | 260 | 261 |

| | | | Ex. 5 | Comp. Ex. 1 | Comp. Ex. 2 | Comp. Ex. 3 |
|---|---|---|---|---|---|---|
| Base Oil Type | | | DPE | DPE | DPE | DPE |
| Starting Material for Thickeners 1) | Isocyanates (g) | MDI | 59 | 50 | | |
| | | TDI | | | 121 | 103 |
| | Amines (g) | CHA | 33 | 16 | | |
| | | ODA | 38 | 64 | | 32 |
| | | OA | | | | |
| | | P-TD | | | 149 | 115 |
| | Li12OHSt (g) | | | | | |
| Thickener Structure (mol %) 2) | Diurea Compounds [R$^1$—R$^1$—R$^3$] | | CH—M—CH(67) CH—M—OD(6) OD—M—OD(27) | CH—M—CH(24) CH—M—OD(32) OD—M—OD(44) | pT—T—pT(100) | OD—T—OD(6) OD—T—pT(8) pT—T—pT(86) |
| | Others | | | | | |
| Amount of Thickener (wt. %) | | | 13 | 13 | 22 | 29 |

TABLE 1-continued

| | | | | | |
|---|---|---|---|---|---|
| CHA Ratio of Thickener (%) | | 70 | 40 | — | — |
| Consistency 60 w | | 250 | 255 | 273 | 285 |

| | | | Comp. Ex. 4 | Comp. Ex. 5 | Comp. Ex. 6 |
|---|---|---|---|---|---|
| Base Oil Type | | | DPE | PAO | PAO |
| Starting Material for Thickeners 1) | Isocyanates (g) | MDI | | 47 | 89 |
| | | TDI | | | |
| | Amines (g) | CHA | | 17 | 71 |
| | | ODA | | 56 | |
| | | OA | | | |
| | | P-TD | | | |
| Thickener Structure (mol %) 2) | Li12OHSt (g) | | 110 | | |
| | Diurea Compounds [$R^1$—$R^1$—$R^3$] | | | CH—M—CH(27) CH—M—OD(36) OD—M—OD(37) | CH—M—CH(100) |
| | Others | | Li12OHSt(100) | | |
| Amount of Thickener (wt. %) | | | 11 | 12 | 16 |
| CHA Ratio of Thickener (%) | | | — | 45 | 100 |
| Consistency 60 w | | | 270 | 259 | 265 |

1) Abbreviations
DPE: Alkyldiphenyl Ether (100 cSt at 40° C.)
PAO: Poly α-olefin (100 cSt at 40° C.)
MDI: Diphenylmethane-4,4′-diisocyanate
TDI: Tolylene Diisocyanate
CHA: Cyclohexylamine
ODA: Octadecylamine
OA: Octylamine
P-TD: Paratoluidine
Li12OHSt: Lithium 12 Hydroxystearate
CHA Ratio: [{(Number of Cyclohexyl Groups and/or Derivatives Thereof)/(Number of Cyclohexyl Groups and/or Derivatives Thereof + Number of Alkyl Groups)} × 100]
*The amount of the grease composition was set to 1 kg for respective examples and comparative examples.
2) Thickeners
The combination of $R^1$, $R^2$ and $R^3$ in the diurea compounds $$R^2-\overset{O}{\underset{\|}{NHCNH}}-R^1-\overset{O}{\underset{\|}{NHCNH}}-R^2?$$

was expressed as $R^2-R^1-R^3$.
Abbreviations:

M: 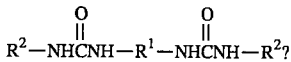

T: 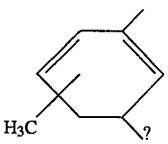

CH: Cyclohexyl Group
OD: Octadecyl Group
O: Octyl group
pT: p-tolyl
Li12OHSt: Lithium 12 Hydroxy Stearate

TABLE 2

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Bearing Grease Service Life Test (hrs) (180° C., 15740 rpm) | 1000 or more | 1000 or more | 1000 or more | 1000 or more | 880 | 570 | 1000 or more | 1000 or more | 70 | 250 | 490 |
| High-Speed Burning Test (hrs) (150° C., 20000 rpm) | 1000 or more | 1000 or more | 1000 or more | 1000 or more | 1000 or more | 850 | 430 | 610 | 220 | 790 | 1000 or more |
| Bearing Grease Leakage Test (wt %) | 3.5 | 5.7 | 4.3 | 4.5 | 8.2 | 22.5 | 5.6 | 5.9 | 65.3 | 25.3 | |

TABLE 2-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| (180° C., 15740 rpm, 20 h) Bearing Service Life Test (hrs) 200 kgf, 110° C., 18000 rpm) | 1000 or more | 1000 or more | 1000 or more | 1000 or more | 1000 or more | 1000 or more | 410; Burning | 1000 or more | 320; Exfoliation | 730; Exfoliation | 820; Exfoliation |
| Noise Test (1800 rpm) | ●–○ | ● | ● | ● | ● | ● | X | Δ–X | ● | ● | ●–○ |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A grease composition for a high-speed rolling bearing comprising an alkyl diphenyl ether oil as a base oil, and a diurea compound or mixture of diurea compounds, represented by the formula (1)

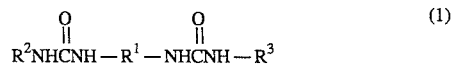

wherein $R^1$ denotes a divalent aromatic hydrocarbon residue having 6 to 15 carbon atoms and $R^2$ and $R^3$ may be the same or different and each represent a cyclohexyl group, a cyclohexyl derivative group having 7 to 12 carbon atoms or an alkyl group having 8 to 20 carbon atoms, said diurea compound being contained as a thickener in said base oil, a content in percent of said cyclohexyl group and said cyclohexyl derivative group in said diurea compound or mixture of diurea compounds being such that a value of [{(numbers of cyclohexyl groups and derivative groups thereof)/(numbers of cyclohexyl groups and derivative groups thereof plus numbers of alkyl groups)}×100] is equal to 50 to 100%, said diurea compound being contained in an amount of 16 to 30 wt. % based on a total weight of the composition.

2. The grease composition as claimed in claim 1 wherein said alkyl diphenyl ether oil is a base oil in which 1 mol or more of α-olefin with 10 to 22 carbon atoms is added to 1 mol of diphenyl ether.

3. The grease composition as claimed in claim 1 wherein said alkyl diphenyl ether oil has a dynamic viscosity of 20 to 300 cSt at 40° C.

4. The grease composition as claimed in claim 1 wherein said alkyl diphenyl ether oil contains 100 parts by weight or less of a lubricating oil selected from the group consisting of a pentaerythritol ester, a dipentaerythritol ester, a timethylolpropane ester and mixtures thereof based on 100 parts by weight of said alkyl diphenl ether oil.

5. The grease composition as claimed in claim 1 wherein $R^1$ in said formula (1) is selected from the group consisting of

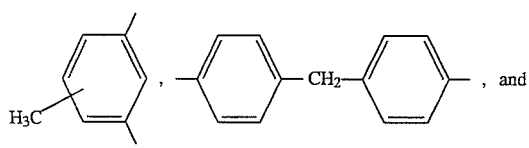, and

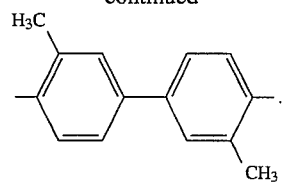

6. The grease composition as claimed in claim 1 wherein $R^2$ and $R^3$ of said formula (1) are selected from the group consisting of a methyl cyclohexyl group, dimethyl cyclohexyl group, ethyl cyclohexyl group, diethyl cyclohexyl group, propyl cyclohexyl group, isopropyl cyclohexyl group, 1-methyl-3-propyl cyclohexyl group, butyl cyclohexyl group, pentyl cyclohexyl group, pentylmethyl cyclohexyl group and a hexyl cyclohexyl group, and wherein when one or more alkyl groups are present in the diurea compound, $R_2$ and $R_3$ of said formula (1) are selected from the group consisting of an octyl group, nonyl group, decyl group, undecyl group, dodecyl group, tridecyl group, tetradecyl group, pentadecyl group, hexadecyl group, heptadecyl group, octadecyl group, nonadecyl group, and an eicosyl group.

7. The grease composition as claimed in claim 1 wherein a combination of $R^2$ and $R^3$ of said formula (1) is selected from the group consisting of cyclohexyl-cyclohexyl groups, cyclohexyl-tetradecyl groups, cyclohexyl-hexadecyl groups, cyclohexyl-octadecyl groups, tetradecyl-tetradecyl groups, tetradecyl-hexadecyl groups, tetradecyl-octadecyl groups, hexadecyl-hexadecyl groups, hexadecyl-octadecyl groups, and octadecyl-octadecyl groups.

8. The grease composition as claimed in claim 1 further comprising an additive selected from the group consisting of thickener other than said diurea compound, antioxidant, extreme pressure agent, oiliness agent, rust preventives, metal deactivator, viscosity index improver and mixtures thereof in an amount of 20 wt. % or less based on a total weight of the composition.

9. The grease composition as claimed in claim 1 wherein the $R^1$ in said formula (1) is

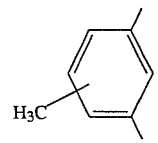

10. The grease composition as claimed in claim 1 wherein the $R^1$ in said formula (1) is

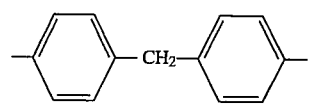
11. The grease composition as claimed in claim 1 wherein said diurea compound is contained in an amount of 16 to 25 wt. % based on total weight of the composition.
* * * * *